July 27, 1943.　　　　G. E. SYKORA　　　　2,325,435
SIGN
Filed June 11, 1940　　　2 Sheets-Sheet 1
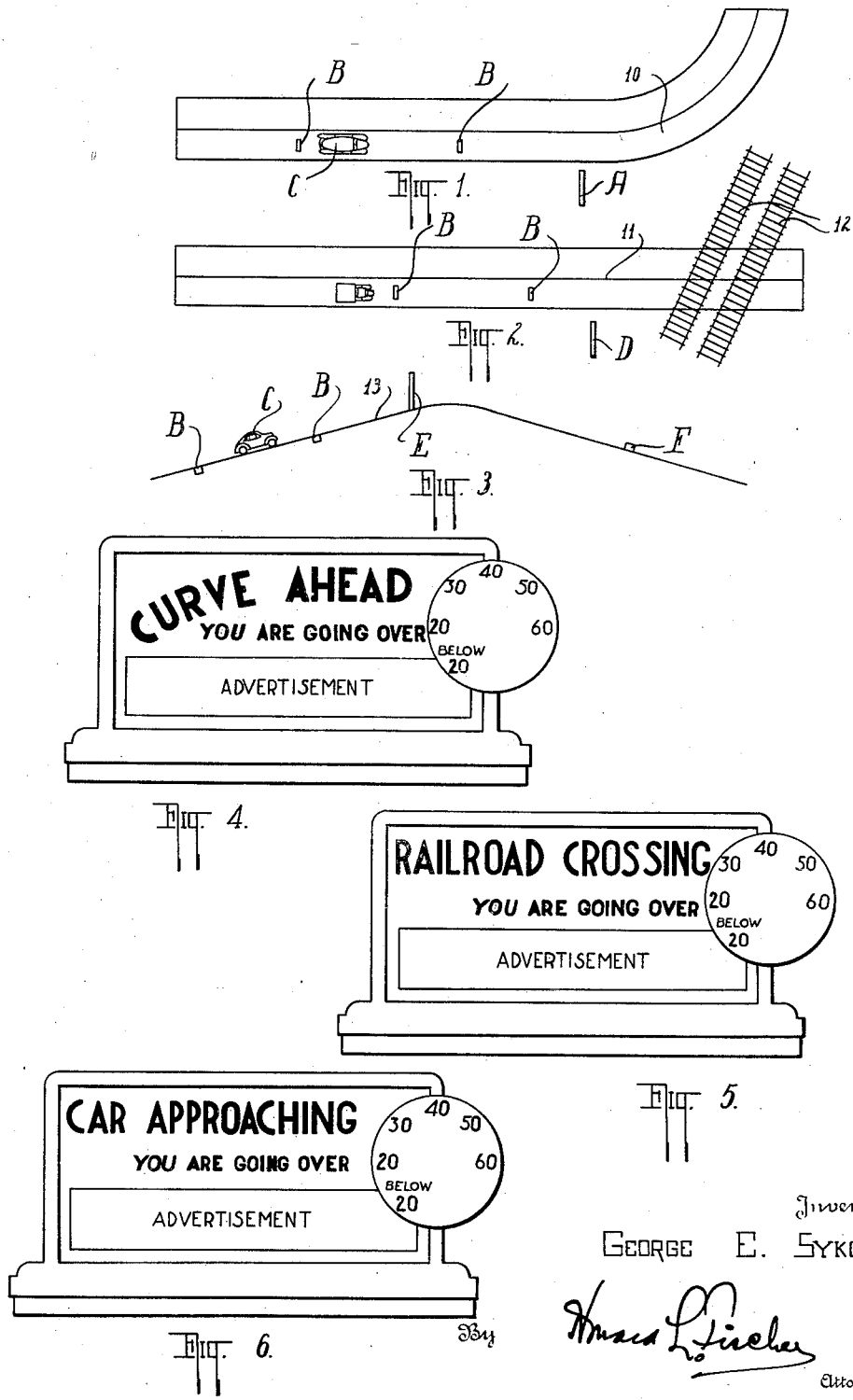

July 27, 1943.                G. E. SYKORA                2,325,435
                                SIGN
              Filed June 11, 1940          2 Sheets-Sheet 2

Inventor
GEORGE E. SYKORA
By Howard L. Fischer
Attorney

Patented July 27, 1943

2,325,435

UNITED STATES PATENT OFFICE 2,325,435

SIGN

George E. Sykora, Minneapolis, Minn.

Application June 11, 1940, Serial No. 339,963

6 Claims. (Cl. 177—337)

My invention relates to an improvement in signs and more particularly in display signs capable of indicating the speed of a vehicle travelling along a highway. While various means have been used to check the speed of travelling vehicles, no means has previously been constructed, insofar as I am aware, to designate to the driver from an external source the speed at which the vehicle is travelling. Because of the large number of highway accidents, authorities are constantly attempting to curb the speed of vehicles, particularly at dangerous points along the road.

It has been found that the occupants of a vehicle travelling along a highway will note a display sign along the road more quickly than they would note the speedometer of the vehicle. It is necessary for the driver of a vehicle to watch the road and watch for warning signs along the road, but because of the frequency of these signs and the similarity between the same, caution and warning signs are often not heeded.

It is the purpose of the present invention to provide a display sign adjacent a dangerous part of the road which will be illuminated by movement of the vehicle along the road and which will designate upon the sign the speed at which the vehicle is travelling along the road. It is felt that such a warning sign will better than any other means visibly warn the driver that he is travelling at a speed which is excessive under the dangerous conditions and therefore will cause the driver to drive more safely at this dangerous point in the road.

Various laws have been enacted to curb the speed of vehicles at dangerous points in the road, but these laws are difficult to enforce. I believe that my warning sign will create a closer cooperation between motorists and law enforcing officers in their attempt to prevent accidents.

It is a purpose of the present invention to provide a pair of spaced detectors over which each vehicle travelling in a single direction must pass and to create an electrical impulse which will operate a suitable timing mechanism to designate the speed of the moving vehicle. While it is possible to indicate the exact speed to the vehicle, it is preferable and less expensive to provide merely a series of circuits indicating that the vehicle is travelling at a speed greater than a certain amount. In other words, in the simplest form, my indicator will indicate that the vehicle is travelling over thirty, over forty, or over fifty miles an hour, for example, rather than to indicate the exact speed, although the provision of the exact speed is possible without changing the invention.

It is a feature of my invention to provide a pair of detectors in a highway, a predetermined distance apart, and to utilize the time interval between actuations of these detectors by a vehicle to cause an indication of the speed at which the vehicle is travelling.

It is a further feature of my invention to provide a timing motor which is set in motion by the passage of a vehicle over one detector and which consecutively closes a series of contacts in separate circuits. The passage of the vehicle over the second detector causes a circuit to be closed through the timing device at the particular instant at which the vehicle crosses the second detector. This circuit causes illumination of a particular indicator speed, the illumination of which is prolonged by a suitable timing mechanism. The timing device set in movement by the passage of the vehicle over the first detector causes switches to be consecutively closed, ranging from an extremely high speed to a relatively low speed. Thus if the vehicle passes over the second detector to close a circuit through the timing device at an extremely short time after the first detector has been actuated, the timing device will not have travelled a great distance and therefore will indicate a high speed. If, however, the vehicle is travelling at a lower rate of speed, the timer motor will have progressed a greater distance, and therefore a lower speed will be indicated when the energizing circuit is closed by the passage of the vehicle over the second detector.

These and other objects and novel features of my invention will be more clearly and fully set forth in the following specification and claims.

In the drawings forming a part of my specification:

Figure 1 is a diagrammatic top view of a highway illustrating a sign adjacent a dangerous curve therein.

Figure 2 is a diagrammatic plan view of a highway and intersection which is in the present case a railroad intersection.

Figure 3 is a diagrammatic elevation view of a hill, illustrating the use of a sign to warn vehicles of the dangerous condition.

Figure 4 is a diagrammatic view of a sign which may be used in conjunction with the curve indicated in Figure 1.

Figure 5 is a diagrammatic view of a sign which may be used adjacent the railroad crossing illustrated in Figure 2.

Figure 6 is a diagrammatic view of the sign used in conjunction with the hill illustrated in Figure 3 of the drawings.

Figures 7, 8:
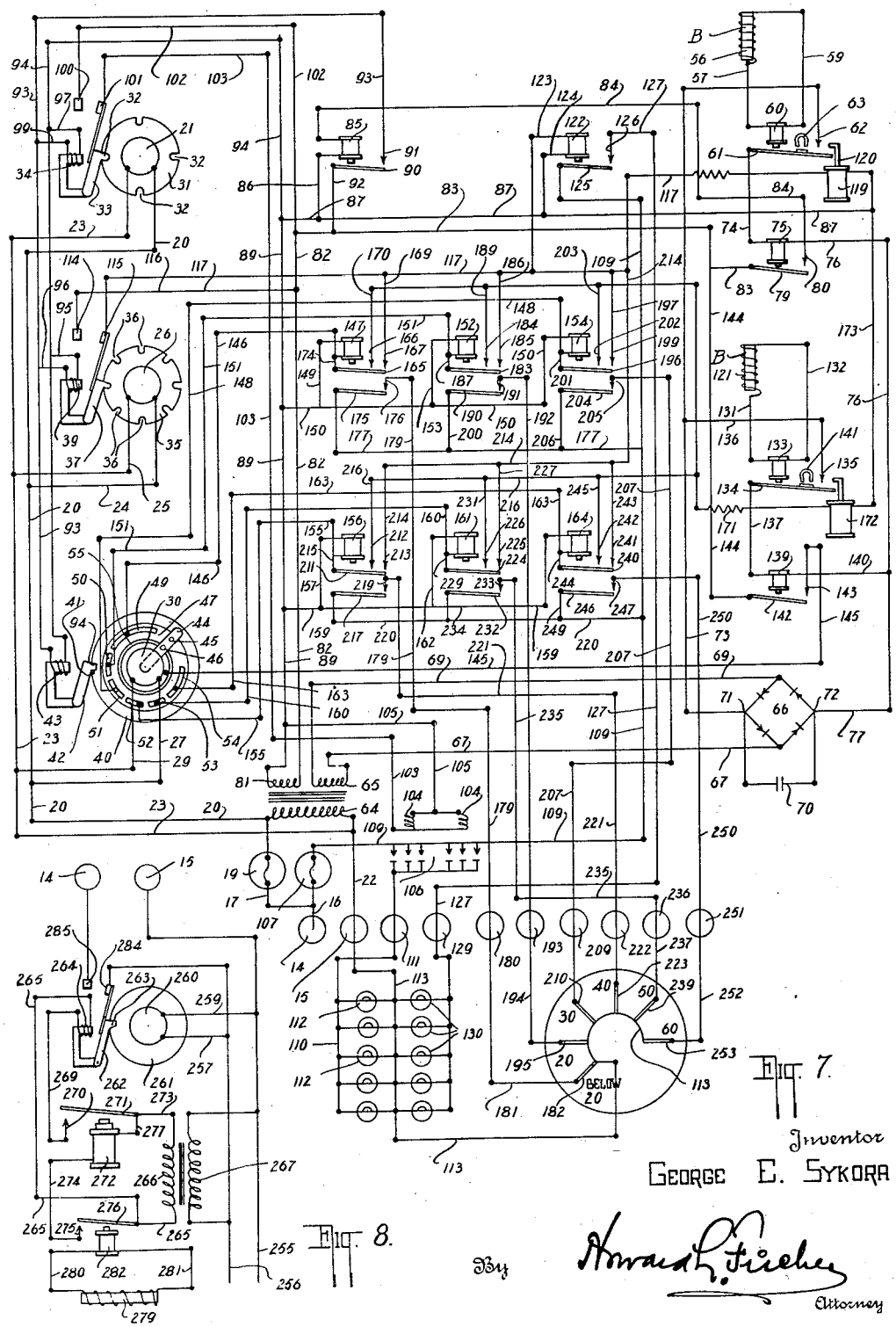
Figure 7 is a wiring diagram illustrating the construction of my indicating device.
Figure 8 is a diagrammatic view of an attachment which may be used in conjunction with the wiring diagram in order to render the sign inoperative except under predetermined conditions.

My sign A is designed for use in conjunction with a curve in the highway 10 as illustrated in Figure 1 of the drawings. The highway 10 is provided with detectors B mounted therein for the purpose which will be later described so that the speed of the vehicle C may be indicated upon the display sign A.

In Figure 2 of the drawings, the sign D illustrated in Figure 5 is shown mounted along the highway 11 having railroad tracks 12 crossing the same. Detectors B are mounted in the highway to actuate the sign D.

A sign E may be mounted adjacent the top of a hill 13 to indicate to the occupants of the car C on the hill that a dangerous condition in the road exists. The sign E may be illuminated only in the event of a vehicle approaching in the opposite direction if it is desired, and this result may be accomplished by merely adding a timing device actuated by a car on the opposite side of the hill from the sign, which closes the supply circuit to the sign for a predetermined length of time after crossing a detector F on the opposite side of the hill 13 from the car C. The usual detectors B are provided to be operated by the car C to illuminate the sign E in case the circuit thereto has been closed by actuation of the detector F. Similarly it is possible to install a suitable warning sign at any dangerous point of a highway such as at the city limits or at any dangerous intersection.

The speed indicating device may be best understood from an observation of Figure 7 of the drawings. This figure discloses a pair of supply wire terminals 14 and 15. Terminal 14 extends through conductors 16 and 17, through the fuse 19 connected to conductor 20 which extends to a timer motor 21. The line wire 15 extends through conductors 22 and 23 to the other contact of the motor 21 closing a circuit to the motor 21. Conductors 24 and 25 are tapped from conductors 20 and 23 to energize the motor 26. Similar conductors 27 and 29 are tapped from the supply wires 20 and 23 and extend through the motor 30. It will be seen that the motors 21, 26, and 30 are constantly connected with the supply terminals 14 and 15 and therefore are constantly energized. Obviously, the current supply through the line wires 14 and 15 may at any time be cut off by a suitable switch not illustrated in the drawings. The motors 21, 26, and 30 are of a type which may be constantly energized without injury thereto or without undue heating of the motor actuating coils. A disc 31 having a series of peripheral notches 32 is mounted for rotation with the motor 21. A pivot latch or dog 33 normally tends to engage in one of the notches 32. A magnet coil 34 is provided adjacent the latch or dog 33 to withdraw the latch from the disc 31 to permit the disc 31 to rotate until the latch 33 drops into the next following notch 32 during the rotation of the disc 31 by the motor 21.

A disc 35 provided with a series of peripheral notches 36 is mounted for rotation by the motor 26. A pivoted dog or latch 37 is designed to normally engage in one of the notches 36 and when withdrawn from one notch will permit rotation of the disc until the dog 37 drops into the next adjacent notch during rotation of the disc 35. A magnet coil 39 is provided adjacent the dog 37 to pivot this dog out of engagement with any notch 36 to permit rotation of the disc 35 through a predetermined angularity. The disc 35 similarly to the disc 31 rotates at a low rate of speed which we may consider once every minute or once every two minutes as an example.

A timer disc 40 is connected to the motor 30 to rotate therewith. This disc 40 is provided with a peripheral notch 41 therein engageable with a latch or dog 42 pivotally mounted adjacent the disc. The latch or dog 42 will normally engage in the notch 41 and may be pivoted out of contact with the notch by means of a suitable magnet coil 43. When the magnet coil 43 is deenergized, the latch or dog 42 will again engage in the notch 41 to stop rotation of the motor 30.

A contact arm 44 is provided with a pair of spaced contacts 45 and 46 and is rotatable with the motor 30. This contact arm 44 rotates over a stationary ring 47 having mounted thereupon a series of contact segments 49, 50, 51, 52, 53, and 54. The contact 45 on the arm 44 successively engages these fixed arcuated contact segments, while the contact 46 constantly engages the contact ring 55. Thus the arm 44 successively closes contacts from the ring 55 to the various contact segments 49 through 54 inclusive.

The first detector B over which the vehicle passes is indicated at 56 in Figure 7 of the drawings. This detector is of the magnetic type embodying a magnetic coil connected by conductors 57 and 59 to the magnet 60. This magnet 60 forms a part of a micro relay including an armature 61 designed to contact the contact 62. The armature 61 is normally held raised after the magnet 60 has been energized by a fixed magnet 63, although it will be understood that this magnet 63 is not of sufficient strength in itself to raise the armature 61.

A transformer 64 is connected between the fuse 19 in the supply wire 17 from the supply terminal 14 and the conductor 22 connected to the supply terminal 15. A secondary coil 65 supplies a low voltage current, for example, a ten volt current, to the rectifier 66, the circuit extending from the coil 65 through the conductor 67 to the rectifier 66, returning through conductor 69 to the other end of the coil 65. The rectifier 66 produces a low voltage direct current. A condenser 70 is connected between the out-put terminals 71 and 72 of the rectifier 66.

A direct current circuit extends from the output terminal 71 of the rectifier 66 through the conductor 73 to the contact 62 engageable with the armature 61. When the armature 61 is in raised position, a circuit is closed from the output terminal 71 of the rectifier 66 through the conductor 73, the contact 62, the armature 61, the conductor 74, the relay magnet coil 75, conductor 76, and conductor 77 to the out-put terminal 72 of the rectifier 66. Thus when the armature 61 is raised, the relay coil 75 is energized acting to engage the armature 79 with its cooperating contact 80. The transformer 64 is provided with a coil 81 providing a source of 20-volt current supply. The closing of the armature 79 with its contact 80 causes a circuit to be closed from one terminal of the coil 81 through a conductor 82 and conductor 83 to the armature 79 and through the contact 80 and its connected conductor 84 to the relay magnet coil 85, which is connected by conductors 86 and 87 to the supply line 89 connected to the other terminal of the coil 81. Thus the actuation of the relay magnet 75 causes the relay magnet 85 to be energized, pivoting the armature 90 upwardly into engagement with its cooperating contact 91.

The armature 91 is connected by wire 82 to the conductor 83 which is connected by wire 82 to one side of the current supply coil 81. The contact 91 is connected by conductor 93 to the coil 43 adjacent the dog or latch 42. The other end of the coil 43 is connected by the conductor 94 to the supply line 89 connected to the opposite side of the coil 81. Thus when the armature 90 is raised, a circuit is closed from the current supply coil 81 to the coil 43, pivoting the latch dog 42 out of engagement with the disc 40 and permitting the motor 30 to rotate the contact arm 44. The coil 39 is connected by wires 95 and 96 to the wires 93 and 94, and the coil 34 is connected by the wires 97 and 99 to these same supply wires 93 and 94. Accordingly, the actuation of the magnet 85 causes each of the coils 34, 39, and 43 to be energized, thus withdrawing the latches or dogs 33, 37, and 42, respectively, out of engagement with their corresponding discs 31, 35, and 40 so that the motors 21, 26, and 30, respectively, may rotate these various timing discs. A pair of contacts 100 and 101 are secured to the latch or dog 33 so that these contacts are closed when the dog 33 is pivoted out of the notch 32 and remain closed as long as the motor 21 operates to rotate the disc 31. As soon as the latch 33 drops in the next succeeding notch 32, the contacts 101, 102 are broken. The closing of contacts 100, 101 closes a circuit from the current supply coil 81 through the conductor 82 and the conductor 102 through the contacts 100, 101, the conductor 103, through a pair of magnet coils 104 which are connected in parallel by the wire 105 to the current supply wire 89 attached to the other end of the coil 81. Thus the closing of contacts 100, 101 energizes the magnets or solenoids 104 which close a switch means 106. The closing of the switch 106 closes a circuit from the terminal 14 through conductors 16, the fuse 107, and the conductor 109, through the switch 106 and conductor 110, leading through the terminal 111, to one terminal of each of a series of lights 112. The other terminal of each of the lights is connected by conductor 113 to the supply terminal 15. Thus a series of lights 112 are illuminated by the closing of the contacts 100, 101 resulting in the closing of the magnetically operated switch 106 which provides a direct line from the supply terminals to the lights 112. The lights 112 illuminate the advertising material on the highway sign A so that an advertising display describing a dangerous condition in the road is inaugurated.

A pair of contacts 114, 115 are connected to the latch 37 so that the pivoting of the latch 37 by the coil 39 out of engagement with the notch 36 will close the contacts 114 and 115 and will hold these contacts closed until the latch 37 engages the next succeeding notch 36. The closing of the contacts 114, 115 closes a circuit from the current supply wire 82 connected to one end of the coil 81 through a conductor 116, the contacts 114 and 115, through a conductor 117 to one terminal of the solenoid 119. The solenoid 119 is connected by conductor 87 to the other current supply line 89 at the other end of the coil 81. Thus the closing of the contacts 114, 115 energizes solenoid coil 119 which actuates its hook-shaped core or armature 120 which forcibly pulls the armature 61 of the micro relay 60 out of engagement with the permanent magnet 63 to break the circuit through the armature 61 to the relay 75. The separation of the armature 79 from its contact 80 breaks the circuit to the relay coil 85, which in turn breaks the circuit to the latch actuating coils 34, 39, and 43 respectively. As the circuit to each of these last mentioned coils has been closed a sufficient time to permit the motors 21, 26, and 30 to start the rotation of their corresponding timer discs, however, the breaking of the circuit to these coils does not affect the operation of the device. By breaking the circuit to the latch actuating coils 34, 39, and 43, the corresponding latches are permitted to stop the retarded timing discs when next the latches engage a notch in the periphery thereof.

From the foregoing description, it will be clearly apparent that the actuation of a vehicle over the first detector B designated as 56, the three timer motors 21, 26 and 30 will start rotating the associated timer discs 31, 35, and 40, which will cause illumination of the advertising lights 112 on the display sign A and the starting of the motor 26 will cause solenoid 119 to break the contact caused by the micro relay 60. The contact arm 44 will thereby start its rotation, successively engaging contact segments 54, 53, 52, 51, 50, and 49. During this rotation, however, prior to the actuation of the second detector B indicated in the drawings by the numeral 121, the circuit to the contact arm is broken. The closing of the contacts 114, 115 also actuates the relay magnet 122, the circuit extending from the current supply wire 82 connected to one end of the coil 81, through the conductor 116, through the contacts 114, 115, the conductor 117, conductor 123, magnet relay coil 122, conductor 124, conductor 87, to the other current supply wire 89 connected to the other end of the coil 81. The closing of the circuit to the relay coil 122 acts to close a circuit from the supply terminal 14 through fuse 107 and conductor 109 to the armature 125, and through this armature and its cooperating contact 126 to the conductor 127 extending through the terminal 129 to one contact of each of a series of lights 130. The other contact of each of these lights 130 is connected by the common wire 113 to the other current supply terminal 15. Thus the closing of the contacts 114, 115 causes illumination of the lights 130 which illuminate the portion of the sign stating that the vehicle is travelling over a predetermined amount of speed. In other words, the words "You Are Travelling Over" are illuminated by the closing of the contacts 114, 115, as it is not necessary for these lights to be illuminated as long a period of time as the advertisement and warning signal. When the second detector B designated at 121 in the drawings is actuated subsequent to the actuation of the first detector 56, a current flows through the wires 131 and 132 to the micro relay coil 133. The current flowing through the coil 133 draws the micro relay armature 134 upwardly into contact with its corresponding contact 135. This action closes a circuit from the out-put terminal 71 of the rectifier 66 through conductors 73, through conductor 136, contact 135 and armature 134, conductor 137, relay magnet coil 139, conductor 140, conductor 77, to the other out-put terminal 72 of the rectifier 66. Thus the actuation of the detector 121 acts to close a circuit to the relay magnet coil 139, which circuit is maintained by the permanent magnet 141. The current flowing through the relay magnet coil 139 draws the armature 142 against its corresponding contact 143. This forms a contact from the current supply wire 82 attached to one end of the supply coil 81 through the conductor 83 and conductor 144 through the armature 142 and its corresponding contact 143, through the conductor 145 to the common contact ring 55 on the insulation disc 47. A circuit is thus formed through the foregoing wires from one side of the coil 81 through one or another of the contact segments 49 through 54 inclusive which are electrically connected to the other supply wire 89 of the coil 81. The segment 49 is connected by the conductor 146 to the relay magnet coil 147, the other terminal of which is connected by the conductor 149 to the wire 150 leading to the supply wire 89 connected to the other side of the coil 81. The segment 50 is connected by the wire 151 to the magnet relay coil 152, the other terminal of which is connected by a conductor 153 to the wire 150. The segment 51 is connected by the conductor 148 to the relay magnet coil 154, the other terminal of which is connected to the wire 150. The segment 52 is connected by the conductor 155 to the magnet relay coil 156, the other terminal of which is connected by conductor 156 and the wire 159 to the current supply line wire 89. The segment 53 is connected by the conductor 160 to the relay magnet coil 161, the other terminal of which is connected by the conductor 162 to the common conductor 159. The remaining segment 54 is connected by the conductor 163 to the relay magnet coil 164, the other terminal of which is connected by the wire 159 to the current supply line wire 89.

Thus it will become obvious that as a vehicle passes the detector 121, the relay 133 closes a circuit to the relay 139 which in turn closes a circuit through the contact arm 44 of the timer which causes a circuit to extend through one of the segments 49 to 54, thereby closing a circuit to one of the relays 147, 152, 154, 156, 161, or 164.

Closing a circuit through the relay coil 147 acts to raise the armature 165 thereof, which armature is connected to the conductor 146 connected to segment 49. The raising of the armature acts to electrically connect a pair of contacts 166 and 167. This closes the circuit from the current supply wire 82 through conductors 116, contacts 114, 115, conductor 117, conductor 169, contacts 166, 167, conductor 170, resistance 171, solenoid coil 172, conductor 173, conductor 87 to the other current supply line wire 89. This actuates the solenoid 172 which acts to forcibly pull the armature 134 away from the permanent magnet 141, breaking the contact to the relay magnet 139. This breaks the circuit to the common conductor ring 55 so that no more than one of the relay magnets 147, 152, 154, 156, 161, and 164 can be operated for a single actuation of the detector 121. The raising of the armature 165 also establishes a holding circuit to the relay magnet 177, which circuit extends from the line wire 82 through conductor 116, terminals 114, 115, conductor 117, conductor 169, armature 165 and conductor 174, relay coil 147, conductor 149, conductor 150, to the line wire 89. Thus as long as the contacts 114, 115 are closed, the armature 165 remains in raised position.

The actuation of the magnet coil 147 also raises a second armature 175 to contact its cooperating contact 176, thereby closing a circuit from line voltage terminal 14, fuse 117, 109, 177, armature 175, contact 176, conductor 179, terminal 180, conductor 181 to indicator lamp 182. The other terminal of the lamp 182 is connected to the common ground wire 113. Thus the raising of relay armature 175 causes illumination of the indicator lamp 182.

The actuation of relay coil 152 raises armature 183, thus causing engagement between armature 183 and the two contacts 184 and 185. This action establishes a holding circuit from supply wire 82 through 116, contacts 114, 115, conductors 117 and 186, contact 185, armature 183, conductor 187, coil 152, through 153 and 150 to the line wire 89. A circuit is also closed from line wire 82 through 116, contacts 114, 115, conductors 117 and 186, contacts 184 and 185, through armature 183, conductor 189 and 170, through resistance 171, solenoid coil 172, conductors 173 and 87 to the line wire 89.

The actuation of the magnet coil 152 also raises armature 190, creating a circuit from line wire 109 connected through fuse 107 to terminal 14, conductors 177 and 200, through armature 190 and its cooperating contact 191, through conductor 192, terminal 193 and conductor 194 to indicate a light 195, the other terminal of which is connected through the common ground wire 113 to terminal 15. Thus when magnet 152 is actuated, a circuit is closed to the indicator light 195 which remains illuminated as long as the contacts 114, 115 are closed.

When the relay coil 154 is energized, the armature 196 is raised, closing a holding circuit from line wire 82 through 116, contacts 114, 115, conductors 117 and 197, contact 199, armature 196, conductor 201, magnet coil 154, to conductor 150, leading to line wire 89. A second circuit is closed from line wire 82 through 116, contacts 114, 115, conductors 117, 197, contacts 199, 202, conductors 203, 170, resistance 171, solenoid coil 172, conductors 173 and 87 to the other line wire 89.

The actuation of relay coil 154 also raises armature 204 into engagement with its corresponding contact 205, closing a circuit from line wire 109 connected to terminal 14 through conductors 177, 206, armature 204, contact 205, conductor 207, terminal 209 to indicator light 210, the other terminal of which is connected to the common ground wire 113 connected to terminal 15. Thus energization of magnet coil 154 acts to illuminate indicator light 210 and to hold this light illuminated as long as contacts 114, 115 are closed.

The energization of solenoid coil 126 causes the raising of armature 211 into engagement with the contacts 212 and 213. This action causes the establishment of a holding circuit from line wire 82 through 116, contacts 114, 115, conductor 117, conductor 124, contact 213, armature 211, conductor 125, coil 156, conductors 157 and 159, to line wire 89. A circuit is also closed from line wire 82 through 116, contacts 114, 115, conductor 117, conductor 214, contacts 213, 212, and armature 211 through conductor 216, resistance 171, solenoid coil 172, conductor 173 and 87 to line wire 89.

The magnet 156 also raises armature 217 into engagement with its corresponding contact 219, causing a circuit to be closed from line wire 109 connected to terminal 14 through conductor 220, armature 217, contact 219, conductor 211, terminal 222 to indicate a line 223, the other terminal of which is connected to the common ground wire 113 connected to terminal 15. Thus when the relay coil 156 is energized, a circuit is closed to illuminate the light 223 and will remain closed as long as the contacts 114, 115 of the timer remain closed.

The closing of the circuit through the relay coil 161 causes the armature 224 thereof to be raised into contact with the contacts 225 and 226. This establishes the holding circuit from the line wire 82 to 116, contacts 114, 115, line wire 117, 214, and 227, contact 225, armature 224, conductor 229 to the magnet coil 161, the other terminal of which is connected by the conductor 162 and 159 to line wire 89. A circuit is also closed from line wire 82 through 116, contacts 114, 115, conductors 117, 214, 227, contacts 225, 226, and armature 224 of the conductors 231, 216, resistance 171, solenoid coil 172, conductors 173 and 87 to line wire 89.

The actuation of the coil 161 also raises armature 232 into engagement with its corresponding contact 233. This action closes a circuit from the line wire 109 connected to terminal 14 through conductors 220 and 234, armature 232, contact 233, conductor 235, terminal 236, conductor 237 to light 239, the other terminal of which is connected to the common ground wire 113 connected to terminal 15. Thus when the magnet coil 161 is energized, a circuit is established to the indicator light 239, which circuit remains established as long as the timer contacts 114, 115 are closed.

The establishment of a circuit through the relay coil 164 acts to raise the armature 240 into contact with its cooperating contacts 241 and 242. This establishes a holding circuit from line wire 82 through 116, contacts 114, 115, conductors 117, 214, 243, contact 241, armature 244, conductor 245, relay coil 164 to conductor 159, which is connected to the line wire 89. A second circuit is also established from line wire 82 through 116, through contacts 114, 115, conductors 117, 214, 243, contacts 241 and 242, armature 240, conductor 245, 216, resistance 171, solenoid 172, conductor 173, and 87 to the line wire 89.

Energization of the solenoid coil 164 also raises armature 246 into contact with its corresponding contact 247, thus closing the circuit from line wire 109 connected to terminal 14 through 220, 249, armature 246, contact 247, conductor 250, terminal 251, conductor 252, to indicate a light 253 which is connected to the common ground wire 113 leading from the supply terminal 50. Thus the establishment of a circuit through relay 164 acts to illuminate the indicator light 239 and to maintain this light illuminated as long as the contacts 114, 115 are closed.

The operation of the speed indicating device will be clearly understood from the foregoing description. When a vehicle passes over the first detector 56, the micro relay 60 is energized, which in turn energizes the relay 75. This closes a circuit through the relay coil 85, which in turn closes a circuit through each of the magnet coils 34, 39, and 43, acting upon the latches or cams 33, 37, and 39 respectively. Thus each of the timer discs 31, 35, and 40 start rotation and rotate slowly. After a relatively short period of time, for example, after seven and one-half seconds, the latch 37 drops into engagement with the next subsequent notch 36. After a correspondingly longer period of for example fifteen seconds, the latch 33 engages the next subsequent notch 32, stopping rotation of the timer disc 31. The disc 40, however, makes one complete revolution in a shorter period of time, for example, two seconds, and ceases operation as soon as the latch 51 again drops into the notch 41.

As soon as the latch 33 is moved out of contact with the disc 31, the contacts 100, 101 are closed, thus closing a circuit to a series of lights 112, which remain illuminated for the longer period of fifteen seconds. The closing of the contacts 114, 115 acts to energize relay 122, which in turn acts to illuminate the lights 130 for a period of for example, seven and one-half seconds. At the same time, the contact arm 44 is revolving over the various segments 49 to 54 inclusive in a clockwise direction, but no circuit is closed to the various indicator lights through this timer or distributor switch, as the circuit is broken through the relay 139.

The closing of the contacts 114, 115 also closes a holding circuit through the solenoid 119 which forcibly draws the armature 61 of the micro relay 60 out of engagement with its terminal 62 and forcibly prevents any movement of the armature 61 during the time the contacts 114, 115 are closed. Thus if two vehicles follow so closely together that one vehicle does not have time to pass the second detector 121 before the second car actuates the detector 56, no indication for the second vehicle will be given. This is not detrimental to the operation of the applicant's device, however, for if two vehicles are travelling over a highway this closely together, they are in almost every case travelling at approximately the same speed, so that a single indication will aptly indicate the speed of both vehicles.

When the vehicle passes over the second detector 121, the micro relay 133 is energized, raising armature 134 and closing a circuit to relay 139. Energization of relay 139 closes a circuit to the common ring 55 of the timer insulated disc 47 over which the contact arm 44 is swinging. From the foregoing description, it will be clear that if the contact arm 44 is in contact with the segment 54, the relay 164 will be energized, causing illumination of the light 253. If the arm 44 is in contact with segment 53 when the vehicle passes over the second detector, the relay magnet 166 will be energized, illuminating the indicator light 239. Similarly, if the arm 44 is in contact with the segment 52, 51, 50, or 49, respectively, the relay magnets 156, 154, 152, and 147 will be energized, and the lights 223, 210, 195, and 182, respectively, will be illuminated.

The segments 49 through 54 inclusive, are so arranged that the contact arm 44 first engages the segment 54 which acts to illuminate light 253 indicating that the vehicle is travelling over sixty miles an hour. It will be obvious that if a small amount of time ensues between the time the vehicle passes over the first detector 56 and the second detector 121, the vehicle must be travelling at an extremely high rate of speed. Similarly, if a considerable length of time ensues between actuations of the first and second detectors, the vehicle must be travelling at a relatively low rate of speed. The segments are graduated in such a way that by spacing the detectors a predetermined distance apart, the contact arm 44 will engage the proper segment to indicate the speed of the vehicle. In the present instance, the detectors are spaced approximately thirty-nine feet to provide the proper indication on the speed indicating display.

Once the cycle of operation has started, the apparatus is inoperable to all vehicles, except the one operating the same until the timer cycle is completed. It has previously been described that the holding solenoid 119 forcibly holds the armature 61 from operation during the period the contacts 114, 115 are closed. It will also be found that after actuation of the micro relay 113 by a car passing over the second detector 121, a circuit through the solenoid 172 will be closed, the core 254 of this solenoid forcibly maintaining the armature 134 out of operation so long as the contacts 114 and 115 are closed.

It will be noted that the lights 112 on the advertising sign are illuminated immediately as soon as a vehicle crosses the first detector, as are also the lights 130 illuminating the words "You Are Travelling Over," or similar indicia. Within two seconds of the illumination of the lights of the sign, the speed indicating light 182, 195, 210, 223, 239, or 253 will be illuminated, providing an indication of the speed of the vehicle. At the end of, for example, seven and one-half seconds, the speed indicating indicia and the lights 130 will be turned off by the breaking of the contacts 114, 115, but the advertising indicia will remain illuminated for a longer period of time. As soon as the contacts 114, 115 are broken, the current to the solenoids 119 and 172 is broken, as are the holding circuits to the various relays. Thus at the end of this seven and one-half second period, the speed indicating apparatus may operate to release the latches 37 and 42 from their corresponding notches, and to permit the speed indicating mechanism to again operate.

It will be noted that unless the vehicle traverses the first detector prior to the crossing of the second detector, the timers will not start rotation, and therefore the device will not operate. In other words, if during the seven and one-half second period required for completing the cycle, a second vehicle should enter the space between the two detectors, the passage of the vehicle over the second detector will not start the indication as the first detector must be operated in order to start the timer discs in motion.

If it is desired to operate the sign E near the top of the hill or at any other dangerous point in the road only when a vehicle is approaching from the opposite direction, this may be accomplished through the use of the attachment illustrated in Figure 8 of the drawings. In this construction, the supply wires 255 and 256 are directly connected by conductors 257 and 259 to a timer motor 260. This motor is designed to rotate a disc 261 which is ordinarily restrained from movement by means of a latch or dog 262 engaging in a peripheral notch 263 in the disc 261. The latch 262 is drawn out of disc engaging position by means of a coil 264 which is connected by a conductor 265 to one end of the secondary coil 266 of a transformer 267. The other terminal of the coil 264 is connected by the conductor 269 to the contact 270 which is cooperable with the armature 271 of the relay magnet 272. The armature 271 is connected by conductor 273 to the other terminal of the secondary coil 266 of the transformer 267.

The relay coil 272 is connected by conductor 274 to the contact 275 which is engageable with the armature 276. This armature is connected by conductor 265 to one terminal of the secondary coil 266. Conductors 277 and 273 connect the other terminal of the coil 272 to the other terminal of the transformer coil 266.

The detector F is placed in the path of vehicles travelling in a direction opposite to the vehicle approaching the sign E, and the passage of a vehicle over the detector F causes a current to flow through the detector coil 279 and conductors 280 and 281 to the micro relay coil 282. The micro relay coil 282 is actuated by the flow of current through the coil 282, closing the armature 276 and thereby closing the circuit to the relay coil 272. The relay coil 272 actuates the armature 271 into engagement with the contact 270, closing a circuit through the coil 264. Actuation of the coil 264 releases the latch 262 and permits the motor 260 to rotate the disc 261 through one revolution. The removal of the latch 262 also acts to close contacts 283 and 284. The line wire 255 is connected to the contact 284 which closes against the contact 283 to close a ciruit through conductor 285 to the terminal 14. The line wire 256 is directly connected to a terminal 15. Therefore, the circuit to the entire sign from the current supply terminals 14 and 15 is broken by the device illustrated in Figure 8, unless a vehicle is approaching the sign from the reverse side of the same.

The attachment illustrated Figure 8 is merely diagrammatic and discloses one way in which a circuit breaking device could be constructed. In actual construction, a slightly different form would probably be used in order that vehicles following one another would each actuate the circuit switch to maintain the circuit closed for a definite time after the passage of the last vehicle.

In accordance with the patent statutes, I have described the principles of operation and construction of my speed indicator; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A vehicle speed indicating device for a highway including a speed indicator mounted adjacent the highway to be viewed by persons travelling over the highway, a series of electric signals on said indicator each designating a particular speed, a timer including a series of timer contacts, means operating said timer continuously through a complete cycle of operation, a first vehicle actuated detector in said highway operable when actuated to start said timer to rotate through its complete circuit, a fixed contact engageable with any of said contacts on said timer, a normally open switch in circuit with said fixed contact, an electrical connection from each of said timer contacts to a respective one of said electric signals, each connection including a circuit sustaining means, each said contact on said timer being connected in circuit with said normally open switch, and said fixed contact through said circuit sustaining means to one of said speeds indicated on said speed indicator, and a second vehicle actuated detector operable when actuated to momentarily close said normally open switch to close a circuit to one of said timer contacts to its respective speed indicating electric signal.

2. A vehicle speed indicating device for a highway including a speed indicator having a series of electric signals each to denote a particular speed, a timer including a series of consecutive contacts, an electrical connection means connecting each contact with one of said electric signals to actuate said signal, a fixed contact consecutively engaging said timer contacts in the operation of said timer, a circuit to said fixed contact including a normally open switch, timer operating means operable when actuated to move the timer through a cycle of operation wherein all of said timer contacts are consecutively engaged by said fixed contact, vehicle actuating means for actuating said timer operating means to start the same, and a second vehicle actuated means operable when actuated to close said normally open switch to complete a circuit to one of said electric signals.

3. A vehicle speed indicating device for a highway including a speed indicator having a series of electric signals each to denote a particular speed, a timer including a series of consecutive contacts, an electrical connection means connecting each contact with one of said electric signals to actuate said signal, a fixed contact consecutively engaging said timer contacts in the operation of said timer, a circuit to said fixed contact including a normally open switch, timer operating means operable when actuated to move the timer through a cycle of operation wherein all of said timer contacts are consecutively engaged by said fixed contact, vehicle actuating means for actuating said timer operating means to start the same, a second vehicle actuated means operable when actuated to close said normally open switch to complete a circuit to one of said electric signals, and means for prolonging the indication of said electric signal.

4. A vehicle speed indicating device for a highway including a speed indicator having a series of electric signals each to denote a particular speed and an indication that the vehicle is travelling faster than the speed indicated, the device comprising a timer including a series of consecutively operable timer contacts thereupon, each timer contact corresponding to one of said electric signals, a circuit from each said timer contact to said corresponding electric signal, a fixed contact consecutively engaging said timer contacts, a normally open circuit to said fixed contact, means operable when actuated to operate said timer in cycles, vehicle actuated means for actuating said timer operating means, and a second vehicle actuated means operable when actuated to close said normally open circuit to thereby close a circuit through the fixed contact and one of said timer contacts to one of said electric signals to denote a particular speed.

5. A vehicle speed indicating device for a highway including a speed indicator comprising an electric sign and a series of electrical signals each to denote a particular speed, a timer including a series of timer contacts each contact corresponding to one of said electric signals, a conductor connecting each timer contact with its corresponding electric signal, a fixed contact successively engaging said timer contacts upon actuation of said timer, a circuit to said fixed contact including a normally open switch, said circuit operable when said normally open switch is closed to energize one of said electric signals, timer operating means operable when actuated to move said timer through a complete cycle of operation, a circuit to said sign including a normally open sign switch, a vehicle actuated means operable when actuated to close said normally open sign switch and to actuate said timer operating means, and a second vehicle actuated means operable when actuated to close said normally open switch in the circuit to said fixed contact.

6. A vheicle speed indicating device for a highway including a speed indicator comprising an electric signal indicating that the vehicle is travelling faster than a certain speed and a series of electric signals each indicating a particular speed, a timer including a series of consecutive timer contacts, means electrically connecting each of said timer contacts with a respective one of said speed indicating signals, a normally open circuit to said timer controlling the illumination of said speed signals, a normally open sign switch controlling the circuit to said electric signal indicating that the vehicle is travelling faster than a certain speed, a means for operating said timer to operate the same through a complete cycle of operation, vehicle actuated means for actuating said timer operating means and for closing said sign switch to provide an electric signal on said speed indicator, and a second vehicle actuated means operable when actuated to close the normally open circuit to said timer to actuate one of said electric signals to denote a particular speed.

GEORGE E. SYKORA.